Jan. 17, 1950        I. T. WEDIN        2,494,846
CALIBRATED LEAD SCREW
Filed May 28, 1947
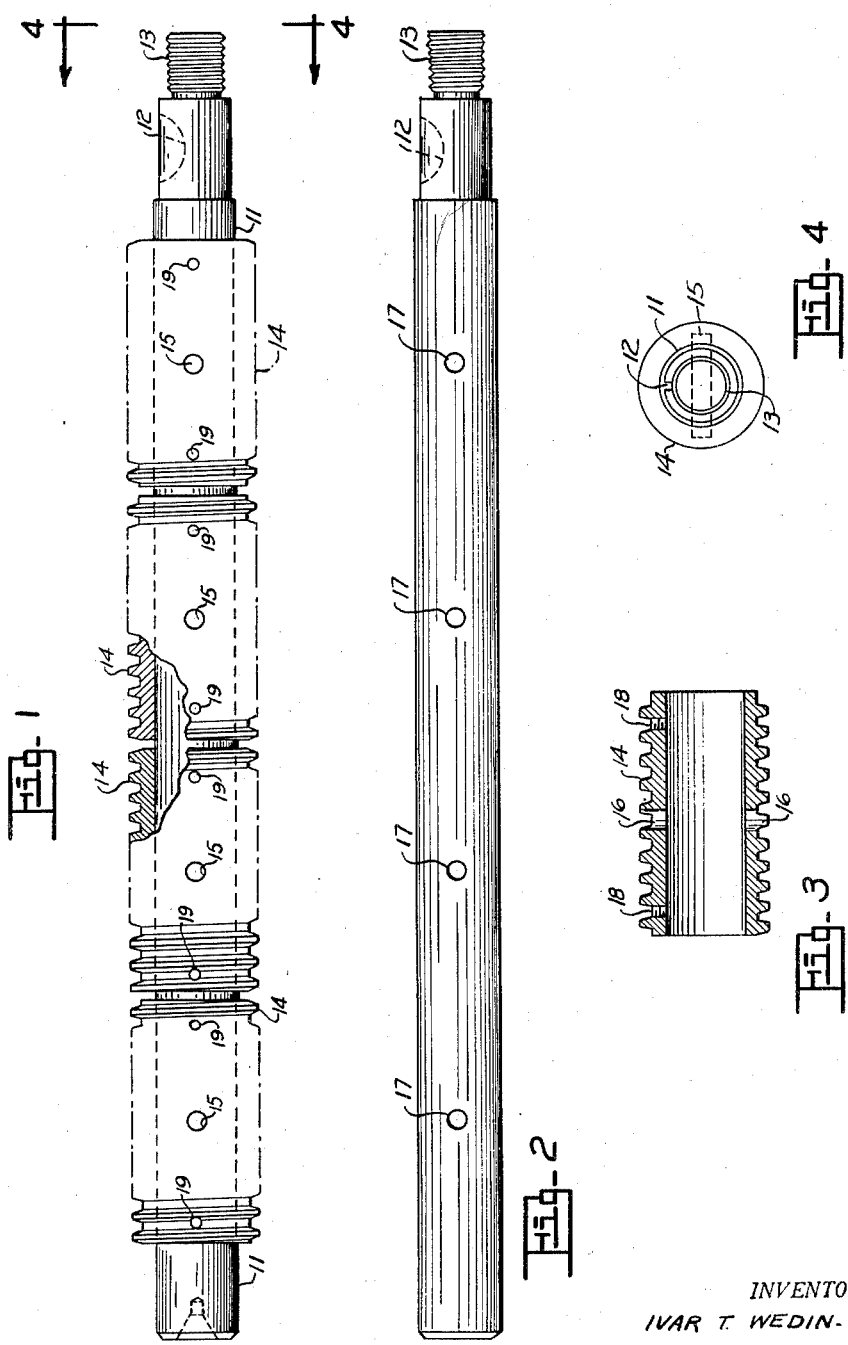
INVENTOR.
IVAR T. WEDIN.
BY
Robert A. Sloman
ATTORNEY.

Patented Jan. 17, 1950

2,494,846

UNITED STATES PATENT OFFICE 2,494,846

CALIBRATED LEAD SCREW

Ivar T. Wedin, Farmington, Mich., assignor of one-half to Gertrude Wedin, Farmington, Mich.

Application May 28, 1947, Serial No. 750,937

10 Claims. (Cl. 74—458)

This invention relates to lead screws employed in machine tools, or in other tools for regulating feed or positioning movements, and more particularly to a calibrated lead screw for accurately controlling such movements.

Heretofore in the construction of lead screws, with the exception of very short lead screws of an inch or two in length, a lead error will develop throughout the length of the lead screw threads, due to heating or other conditions beyond the control of the operator.

In grinding threads on lead screws, for instance, the friction developed generates heat so that the turning lead screw has a slight twisting tendency to produce as much as .00001 inch error per thread. Thus over a length of 200 threads, for example, the total error may be as much as .002 of an inch.

Other sources of lead screw error in the finished lead screw may reside in the inaccuracy of the master lead screw of the machine upon which the lead screw is produced, for illustration. Necessary clearances between gears in the operating mechanism of the machine may also be a source of error.

Varying temperature conditions, and other heating factors of the machine such as the friction of the bearings provide slight variations in the dimensions of the respective parts of the machine, all of which tend to provide errors particularly in the lead of threaded elements produced upon the machine.

It has been a long standing problem to provide a completely accurate lead screw with no lead error, however no means have heretofore been provided for effectively solving the problem, though in many instances it would be desirable and important to obtain a lead screw that was absolutely accurate with no lead error throughout its length.

For instance it would be desirable to have an accurate feed in a jig borer or grinder. Because of existing errors in lead a screw cannot be relied upon for controlling the movements thereof.

In lathes, and for that matter in any mechanism requiring the use of a screw to control movements, it is advantageous and desirable that said screw be accurate, having no lead error. This is particularly so where articles forming a part of instruments or the like are produced upon the lathe or other machine tool.

It is therefore the principal object of this invention to provide a calibrated lead screw with zero lead error throughout its length.

It is the further object of this invention to provide a calibrated lead screw where a predetermined error in the lead may be accomplished if desired.

It is the further object of this invention to provide a plurality of hollow relatively short threaded elements which have no lead error, which may be adjustably mounted upon a shaft, and relatively to each other, and secured to said shaft in calibrated relation, to thereby provide a calibrated lead screw with no lead error throughout the length thereof.

It is the still further object of this invention to provide a method of making calibrated lead screws consisting of slidably mounting a plurality of relatively short accurately threaded elements upon a shaft, longitudinally adjusting the same thereon and with respect to each other to provide the proper number of threads for a given unit of length, rotatably adjusting said threaded elements upon said shaft relatively to each other so that said threaded elements are properly aligned to provide a single continuous thread over the length of said shaft, and effectively securing said adjusted elements upon said shaft.

These and other objects will be seen from the following specification and claims in conjunction with the appended drawing in which:

Figure 1 is a front elevational view of the calibrated lead screw partially broken away and sectioned.

Figure 2 is a front elevational view of the shaft forming the base of said lead screw upon which the threaded segments are adjustably mounted and secured.

Figure 3 is an elevational section of one of the threaded elements; and

Figure 4 is an end elevational view taken on line 4—4 of Figure 1.

It will be understood that the above drawing illustrates merely a preferable embodiment of the invention, and other embodiments are contemplated within the scope of the claims hereafter set out.

Referring to the drawing a solid shaft 11 is shown in Figure 2 with keyway 12 and with short threaded element 13 on one end thereof, upon which the threaded elements 14 Figure 3 are adjustably mounted in the manner hereafter described.

As illustrated in Figure 1 a plurality of threaded elements 14 are adjustably mounted upon shaft 11, with respect to each other and retained thereon by pins 15 which project through transverse openings 16 in elements 14 and through openings 17 which are drilled in shaft 11 once said elements are properly positioned thereon.

It is well known that moderately short threaded elements may be produced with zero lead error wherein the length of said element is approximately one to two inches, as for instance the threaded element 14 Figure 3, which it will be assumed, has zero lead error.

Said element is hollow and is adapted to be slidably mounted upon shaft 11 Figure 2. Element 14 has a central transverse opening 16 drilled therethrough, through which a locking pin is projected after said element is adjustably mounted upon shaft 11, and after a corresponding opening 17 has been drilled through shaft 11 in alignment with opening 16.

Element 14 has a pair of tapped or threaded openings 18 adjacent its ends within which are threadably mounted set screws 19.

In the initial operation one element 14 is first slidably mounted upon shaft 11 adjacent one end thereof, and set screws 19 are tightened into frictional engagement with said shaft for temporarily locking said element in position thereon.

A second element which is relatively short, i. e. approximately two inches, and which has been accurately threaded with no lead error, is slidably mounted upon shaft 11 from its opposite end and slid down thereon into close proximity with the outer end of the first mentioned element 14.

By employing any suitable lead checker the spaced relation between the adjacent ends of elements 14 can be accurately determined to thereby provide continuity between the threads of the two elements. Once the second threaded element has been accurately positioned upon shaft 11, its set screws 19 are turned into frictional engagement with shaft 11 effectively locking said threaded element in position.

It will be noted however that not only must the ends of the threaded elements be properly spaced to provide a fixed number of threads for a predetermined length of shaft, but the threaded elements must be rotatably adjusted upon the shaft so that the end portions of the threads at the adjacent ends of said elements are properly aligned to provide in effect one continuous thread over the two or more threaded elements.

In normal operation the first threaded element 14 is mounted on shaft 11 and preferably secured thereon by the transverse pin 15. Now the second element is slidably mounted upon said shaft and moved towards the inner end of said first threaded element.

By employing a lead checker the spaced relation between the adjacent ends of the first and second threaded elements may be exactly adjusted so as to provide the proper number of threads for a given length of shaft.

The second threaded element must also be rotatably adjusted in one direction or the other until the run-out portion of the threads at the respective adjacent ends of the two elements are in proper alignment to provide a single continuous thread or helix.

For example one way to obtain the proper thread alignment is to mount a threaded nut upon the second threaded element and then rotate said threaded element upon shaft 11 until the nut will properly engage the threads of the first threaded element as said nut is rotated thereon.

Now a lead screw is provided whose threaded portions are accurately calibrated by means of the lead checker above described, and which consists of the pair of threaded elements adjustably mounted and secured upon shaft 11.

Transverse openings 17 are now drilled through shaft 11 with openings 16 in threaded elements 14 acting as a guide in the proper positioning of said openings within shaft 11.

Transverse locking pins 15 are now projected through openings 16 in threaded elements 14 as well as through the aligned openings 17 formed within shaft 11 to thereby provide a complete lead screw in which its calibrated threaded elements are immovably secured thereon in proper and accurate relation. So arranged, and with the assumption that the initial threaded elements 14 are accurately threaded with zero lead error, it will be understood that a lead screw is now provided wherein there is absolutely no lead error throughout its length.

As shown in Figure 1 several additional threaded elements are adjustably mounted upon shaft 11 and first secured thereon in adjusted relation by means of the set screws 19. It will be understood that it is essential that the proper spaced relation be determined between the respective corresponding ends of the threaded elements upon shaft 11. As above described this spaced relation is accurately determined by employing any suitable lead checker.

Said elements once longitudinally adjusted on shaft 11, must still be rotatably adjusted thereon in the manner above fully described, whereby a single continuous thread is produced throughout the length of shaft 11, or the portion thereof over which said elements are mounted.

It will be understood that there may be a trial setting of the plurality of threaded elements 14 upon shaft 11. The lead checker employed will show the extent of lead error. This error may then be divided equally between the various threaded elements so that their respective adjacent ends are approximately equally spaced from each other.

Starting with the second threaded element it is then necessary to separately and rotatably adjust said element upon the shaft so that the run-out portion of its end thread is aligned with the run-out portion of the end thread of the adjacent first mentioned threaded element, to produce a continuous helix or thread throughout the length of both threaded elements. Said second element 14 may then be properly secured in place by the set screws 19.

At this point a transverse opening 17 may be drilled through shaft 11 in alignment with the transverse opening 16 in element 14. Next a locking pin 15 may be projected through openings 16 and 17 for locking element 14 in its adjusted position upon shaft 11.

Next the third threaded element, and so on, is rotatably adjusted on shaft 11, until with all elements properly adjusted and secured, a single continuous thread is produced upon the shaft. That is, a lead screw is provided which has absolutely no lead error throughout its length.

Once the elements 14 are properly adjusted upon shaft 11, and in the manner above indicated suitable transverse slots are drilled through shaft 11 in alignment with the openings 16 in elements 14 which have been previously mounted upon said shaft in adjusted relation and secured thereon by the set screws 19.

By the above method it will be seen that a calibrated lead screw can be produced with absolutely zero lead error throughout its length.

Furthermore it is contemplated that there be no limitation upon the length of the lead screw provided the individual accurately threaded elements 14 are properly mounted upon the shaft in the manner prescribed.

In providing a calibrated lead screw it is normally the object to have a certain number of completed threads for a certain unit of length. It is contemplated that under some conditions it may be desirable to intentionally develop a lead error wherein there will be more or less than the standard number of threads for a prescribed length of screw. It is contemplated that the accuracy of the threaded elements in their end to end relation to one another may be varied depending upon whether a zero lead error is intended or on the other hand whether a slight error one way or the other is desired.

In any event a calibrated lead screw is provided by the means and methods hereinabove described.

It is contemplated that the calibrated lead screw above described is normally employed for use in machines required for accurate machining. The calibrated lead screw is usually constructed and calibrated to the average temperature conditions to which it will be subjected. However, under most conditions temperature variations of as much as 10 degrees would have no appreciable effect on the calibrated lead screw and its accuracy. Normally the room temperature in which the device will be used will remain substantially constant.

On the other hand it is further contemplated that the temperature conditions can be taken into consideration in assembling and in calibrating the lead screw. In other words the lead screw will be calibrated in a room closely approximating the temperature of the room in which it is to be used. In climates where there would be a variation of inside temperature between summer and winter it is further contemplated that there could be a lead screw calibrated for average summer temperatures, and another lead screw calibrated for average winter temperatures. In any event taking into consideration the coefficient of expansion of the metal and the very limited possible degree variation, it will be seen that a variation of even 10 degrees would have no appreciable effect upon the length of a 2 foot lead screw, for illustration.

Under present methods of construction of screws an error of .0005" in 24 inches would normally be considered an accurate screw for normal use. Yet such a screw could not be used for jig boring which at the maximum permit no more than .0001" inch of error. The error of .0005 inch in 24 inches amounts to only approximately .0000208 inch of error per inch.

By the construction and method above described it is possible to produce a calibrated lead screw with zero error, and it is clear that such a lead screw could be used for jig boring by way of illustration.

Having described my invention, reference should now be had to the claims which follow for determining the scope thereof.

I claim:

1. The method of providing a calibrated lead screw consisting of slidably mounting a plurality of threaded elements upon a shaft in spaced relation, adjusting the same longitudinally and rotatively with respect to each other to provide a continuous thread helix having a predetermined number of threads per unit length, securing said threaded elements upon said shaft, drilling transverse openings through said shaft and elements, and projecting locking pins through said transverse openings.

2. The method of providing a calibrated lead screw consisting of slidably mounting a plurality of threaded elements upon a shaft, adjusting said elements longitudinally and rotatively upon said shaft with respect to each other to provide a continuous thread helix having a predetermined number of threads per unit length of shaft, securing said elements upon said shaft, and locking said elements immovably upon said shaft in their respective adjusted positions to thereby provide a lead screw with zero lead error.

3. The method of providing a calibrated lead screw consisting of slidably mounting a plurality of threaded elements upon a shaft, longitudinally and rotatively adjusting said elements upon said shaft with respect to each other to provide a continuous thread helix having a predetermined number of threads for a given length of shaft, securing said elements upon said shaft, and immovably securing said threaded elements upon said shaft.

4. The method of providing a calibrated lead screw consisting of slidably mounting a plurality of threaded elements upon a shaft, longitudinally adjusting the same thereon with respect to each other to provide the required number of threads for a given length of shaft, rotatably adjusting said elements upon said shaft relatively to each other aligning their respective threads to produce a single continuous thread helix throughout said elements, securing said elements upon said shaft, and immovably securing said threaded elements upon said shaft.

5. A calibrated lead screw comprising a shaft of circular cross section, a plurality of spaced threaded elements of constant pitch diameter adjustably mounted upon said shaft with respect to each other to provide a continuous thread helix with the required number of threads for a given length of shaft and transverse locking means projected through said threaded elements and through said shaft.

6. A calibrated lead screw comprising a shaft, a plurality of spaced threaded elements adjustably mounted upon said shaft with respect to each other to provide a continuous thread helix from the threads of the respective threaded elements, and transverse locking means projected through said elements and through said shaft for locking said elements against longitudinal as well as rotary movement with respect to said shaft.

7. A calibrated lead screw comprising a shaft, a plurality of hollow threaded elements slidably and adjustably mounted upon said shaft with respect to each other to provide a continuous thread helix with a predetermined number of threads for a given length of shaft, and threaded means transversely extending through said threaded elements frictionally engaging said shaft for locking said elements against longitudinal as well as rotary movement with respect to said shaft.

8. A calibrated lead screw comprising a shaft, a plurality of hollow threaded elements slidably and adjustably mounted upon said shaft with respect to each other to provide a continuous thread upon said shaft having a predetermined number of threads for a given length of shaft, and transverse locking means projected through said threaded elements and through said shaft.

9. A calibrated lead screw comprising a shaft, a plurality of hollow threaded elements slidably and adjustably mounted upon said shaft with respect to each other to provide a continuous thread helix upon said shaft having a predetermined number of threads for a given length of shaft, threaded means transversely extending through said threaded elements frictionally engaging said shaft for retaining said elements in their adjusted positions, and transverse locking means projected through said threaded elements and snugly through said shaft for retaining said elements thereon.

10. A calibrated lead screw comprising a shaft, a plurality of threaded elements adjustably mounted upon said shaft with respect to each other to provide a continuous thread helix having a predetermined number of threads for a given length of shaft, and transverse locking means projected through said threaded elements and through said shaft for locking said elements thereon against longitudinal as well as rotary movement with respect to said shaft, the spaced relation between the adjacent respective ends of said threaded elements being predetermined.

IVAR T. WEDIN.

REFERENCES CITED

The following references are of record in the file of this patent:

UNITED STATES PATENTS

| Number | Name | Date |
| --- | --- | --- |
| 853,719 | Munro | May 14, 1907 |
| 1,794,907 | Kelly | Mar. 3, 1931 |
| 2,273,784 | Kahl | Feb. 17, 1942 |
| 2,475,045 | Osplack | July 5, 1949 |

FOREIGN PATENTS

| Number | Country | Date |
| --- | --- | --- |
| 292,205 | Germany | May 30, 1916 |